United States Patent [19]

Kondo et al.

[11] Patent Number: 4,789,610
[45] Date of Patent: Dec. 6, 1988

[54] SOLID-ELECTROLYTE SECONDARY CELL

[75] Inventors: Shigeo Kondo, Hirakata; Tadashi Sotomura, Kashiwara; Teruhisa Kanbara, Ikeda; Satoshi Sekido, Yawata, all of Japan

[73] Assignee: Matsushita Electric Industrial Co., Ltd., Osaka, Japan

[21] Appl. No.: 95,146

[22] Filed: Sep. 11, 1987

[30] Foreign Application Priority Data

Nov. 6, 1986 [JP] Japan ............................ 61-264592

[51] Int. Cl.$^4$ ............................................. H01M 6/18
[52] U.S. Cl. ................................... 429/191; 429/218; 252/182.1
[58] Field of Search ............... 429/218, 191, 193, 192, 429/199; 252/182.1

[56] References Cited

U.S. PATENT DOCUMENTS

| | | | |
|---|---|---|---|
| 4,136,233 | 1/1979 | Eisenberg et al. | 429/218 X |
| 4,281,048 | 7/1981 | Haering et al. | 429/218 |
| 4,377,624 | 3/1983 | Joshi et al. | 429/193 X |

OTHER PUBLICATIONS

Yamamoto et al., An all Solid-State Cell with a High--Copper Ion Conductor Electrolyte, Chem Abstracts, vol. 107, 1987; 103:25994t.

Taniguchi et al., Manufacture of a Thin-Film Chevrel--Phase Compound by On-Substrate-Reaction Method, Chem Abstracts, vol. 105, 1986; 105:27148c.

Primary Examiner—Anthony Skapars
Attorney, Agent, or Firm—Spencer & Frank

[57] ABSTRACT

A solid-electrolyte secondary cell comprising a positive and a negative electrode composed of a copper chevrel compound ($Cu_xMo_6S_8$), and copper ion conductive solid electrolyte is provided. This secondary cell is capable of charging with a current as high as about 1 mA/cm$^2$, can stand high temperatures of up to 100° C. and maintains its initial performance even after long-time charging and discharging. A cell small in voltage drop during dicharge is also provided by using a heat treated mixture of a copper chevrel compound and a copper ion conductive solid electrolyte represented by the formula $K_qRb_{1-q}Cu_4I_{2-p}Cl_{3+3}$ ($0 \leq q \leq 0.5$, $0.25 \leq p \leq 1.0$) for both positive and negative electrodes.

19 Claims, 6 Drawing Sheets

SOLID-ELECTROLYTE SECONDARY CELL

BACKGROUND OF THE INVENTION

1. Field of Industrial Utilization

This invention relates to a solid-electrolyte secondary cell featuring use of a copper ion conductive solid electrolyte.

2. Prior Art

With its component elements being all made of solid materials, a solid-electrolyte secondary cell is proof against liquid leakage and can adapt itself to any size of container. Further, as it can be easily reduced in size and thickness, this type of secondary cell has the advantage that it can be integrated in the same package with other electronic parts such as IC's (integrated circuits), resistors, capacitors, etc.

For making such a solid-electrolyte secondary cell, there is required a literally solid electrolyte, in place of liquid electrolyte in ordinary cells.

The RbCl-CuCl-CuI copper ion conductive solid electrolyte discovered by Takahashi, et al. in 1979 [Journal of Electrochemical Society, Vol. 126, pp. 1654, (1979)] has a high ionic conductivity on the order of $10^{-2}$ S/cm, which is well comparable to that of liquid electrolytes, and many studies have been made for the development of solid-electrolyte cells using said type of solid electrolyte.

For composing such a cell, there are required, in addition to solid electrolyte, a pair of reversible copper electrodes which can electrochemically exchange $Cu^+$ ions with the solid electrolyte. The decomposition potential of said copper ion conductive solid electrolyte is usually 0.6–0.7 volts, so that it is necessary to use an electrode material having an electron and ion conductive network which enables dissolution and deposition or intercalation and deintercalation of $Cu^+$ ions at a voltage below said level and which also allows smooth transfer of $Cu^+$ ions and electrons in the electrode without causing any chemical reaction with the solid electrolyte.

Disulphides of transition metals proposed by Whittingham in U.S. Pat. No. 4,009,052 have been highlighted as an electrode material meeting said requirements, and further studies have been made on this material. There have been proposed $TiS_2$ [Japanese Patent Application Kokai (Laid-Open) No. 201267/83] and $NbS_2$ [Japanese Patent Application Kokai (Laid-Open) No. 263052/86] as the disulphides which can constitute a secondary cell in combination with a copper ion conductive solid electrolyte. The secondary cell has $TiS_2$ or $NbS_2$ for positive electrode and a mixture of $Cu_2S$ and Cu proposed in Japanese Patent Publication No. 013709/84 for negative electrode.

These disulphides usually have a layered crystal structure and allow interlayer transfer of $Cu^+$ ions in charging and discharging of the cell, but the region of composition where the reversible transfer of $Cu^+$ ions is possible while maintaining the layered crystal structure is very limited. That is, when $TiS_2$ is represented as $Cu_nTiS_2$ and $NbS_2$ as $Cu_mNbS_2$, the range of n or m where the reversibility can be maintained is 0 to 0.2 at most. When charging or discharging is made exceeding this range, the layered crystal structure is broken to disenable the reversible transfer of $Cu^+$ ions, making the cell unable to perform its normal function. Therefore, the conventional secondary cells of this type could not possess a large capacity, and also charging and discharging of these cells must be controlled so that they would not be charged or discharged over the limits of reversibility, and especially such control was required that they would not be brought into a zero voltage or shortcircuited state or the potential of positive electrode would not become lower than that of negative electrode.

The cell voltage is not flat but lowers uniformly in the course of cell discharging, reflecting the continuous change of activity of $Cu^+$ ions in one crystal phase.

Further, such disulphides are thermally unstable, and especially in the case of $TiS_2$, sulphur starts to vaporize, though slight in amount, from $TiS_2$ at 30°–40° C. Thus liberated sulfur not only acts detrimentally to the cell performance at high temperatures but also becomes a cause of errors of electronic parts when the cells using such disulphides are housed integrally with electronic parts such as IC's, resistors, capacitors, etc., in the same package.

SUMMARY OF THE INVENTION

The present invention provides a solid-electrolyte secondary cell characterized by using a copper chevrel compound, which is a ternary Mo sulphide, for both positive electrode and negative electrode in combination with a copper ion conductive solid electrolyte to thereby overcome said defects of the prior art.

Copper chevrel compounds are represented by the general formula $Cu_xMo_6S_8$, which form a single chevrel phase when the value of x in said formula is in the range of 0 to 5. The compositional ratio of sulfur is represented by 8 in the above fomula but it can actually vary within the range of 8 to 7.5. $Cu^+$ ions can be freely intercalated or deintercalated into or out of the three dimensional network structure constituted by $Mo_6S_8$. The energy required for such transfer of $Cu^+$ ions in the crystal lattice is very small as so is the activation energy needed to ionize metallic copper, so that the electrodes made by using said copper chevrel compound have high reversibility and are minimized in polarization. Therefore, use of such electrodes can offer a cell which is capable of supplying a larger electric current than possible with the cells using the conventional electrodes.

$TiS_2$ and $NbS_2$ allow reversible transfer, i.e. intercalation and deintercalation of $Cu^+$ in an amount of only about 0.2 in terms of elemental ratio to the metallic element Ti or Nb, while the copper chevrel compounds enable such intercalation and deintercalation of $Cu^+$ in as much an amount as close to 1 in terms of elemental ratio and thus can provide a cell having a greater capacity.

The copper chevrel compounds ($Cu_xMo_6S_8$) give a positive potential to metallic copper when the value of x in the above formula is in the range of 0 to 5, and the smaller the value of x, the higher is the positive potential given. On the other hand, when the value of x is greater than 5, said compounds give a potential substantially equal to metallic copper. In the cell of this invention using such copper chevrel compounds for both positive and negative electrodes, it is decided whether the electrode serves as positive electrode or negative electrode by the polarity at the time of charging of the cell. The x value of the copper chevrel compound of the electrode which was decided to serve as positive electrode by charging becomes closer to 0, allowing the electrode to take a more positive potential than metallic copper. On the other hand, the x value of the copper chevrel compound of the electrode decided to serve as negative electrode becomes close to 5 or greater, letting this electrode take a potential close to that of metallic copper. When charging is conducted by reversing the polarity, both electrodes assumed the state just contrary to the above said. Thus, positive electrode can be turned to negative electrode, while negative electrode can be switched to positive electrode. Therefore, even when the cell is discharged to 0 volt and further overdischarged till the positive electrode comes to have a lower potential than the negative electroe, the cell would not break down.

It is possible to keep the cell voltage flat by properly selecting the composition and/or weight of the copper chevrel compound of positive electrode and that of negative electrode so that the former will operate with the value of x defined in the range of 0 to 1 while the latter will operate with the value of x set at 4 or greater.

Further, the copper chevrel compounds are thermally stable at temperatures of up to 250° C., and they never cause vaporization of sulfur and never suffer from degradation on heating at the actual use temperature of cells which is usually below 100° C.

EXAMPLES

EXAMPLE 1

Figure 1:
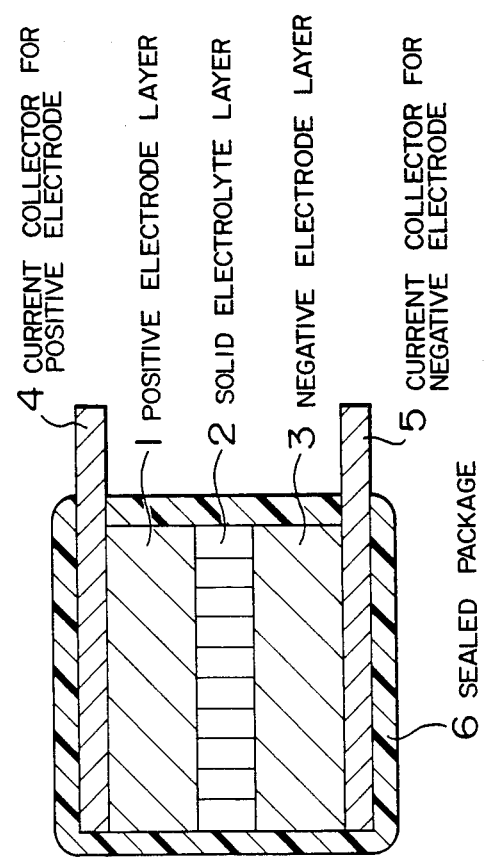
FIG. 1 illustrates a typical sectional structure of the solid-electrolyte secondary cell according to this invention.

Solid-electrolyte secondary cells, Nos. 1–4, each having a sectional structure shown in FIG. 1, were made by using copper chevrel compounds shown in Table 1 for both positive and negative electrodes and solid electrolytes also shown in Table 1.

Said copper chevrel compounds were obtained by mixing powders of copper, molybdenum and sulfur in a given ratio, press-molding the mixture to form pellets, putting them into an evacuated quartz tube, heating the sealed quartz tube at 200° C. for 17 hours and then further heating it at 130° C. for another 17 hours.

Positive electrode powder comprising 200 mg each of said solid electrolyte and copper chevrel compound, 700 mg of said solid electrolyte, and negative electrode powder comprising 200 mg of said solid electrolyte and copper shevrel compound were press molded under pressure of 200 kg/cm$^2$ to form a cell of three-layer structure having a diameter of 10 mm.

In FIG. 1, 1 indicates positive electrode layer, 2 solid electrolyte layer, 3 negative electrode layer, 4 current collector for positive electrode, 5 current collector for negative electrode, and 6 sealed plastic package housing said cell elements.

TABLE 1

| Cell No. | | Positive electrode Material | Weight (mg) | Negative electrode Material | Weight (mg) | Solid electrolyte Material | Weight (mg) | Cell performance after high-temperature storage (Initial capacity = 100) |
|---|---|---|---|---|---|---|---|---|
| Example | 1 | $Cu_2Mo_6S_{7.8}$ | 400 | $Cu_2Mo_6S_{7.8}$ | 400 | $RbCu_4I_{1.75}Cl_{3.25}$ | 500 | 98 |
| | 2 | $Cu_2Mo_6S_{7.8}$ | 400 | $Cu_4I_{1.5}Cl_{3.5}$ | 400 | $RbCu_4I_{1.5}Cl_{3.5}$ | 500 | 97 |
| | 3 | $Cu_4Mo_6S_{7.8}$ | 400 | $Cu_2Mo_6S_{7.8}$ | 400 | $K_{0.2}Rb_{0.8}Cu_4I_{1.5}Cl_{3.5}$ | 500 | 99 |
| | 4 | $Cu_4Mo_6S_{7.8}$ | 400 | $Cu_4Mo_6S_{7.8}$ | 400 | $K_{0.4}Rb_{0.6}Cu_4I_{1.25}Cl_{3.75}$ | 500 | 96 |
| Comparative Example | 5 | $TiS_2$ | 500 | Cu | 400 | $RbCu_4I_{1.75}Cl_{3.25}$ | 500 | 0 |
| | 6 | $TiS_2$ | 500 | $Cu_{0.9}TiS_2$ | 400 | $RbCu_4I_{1.75}Cl_{3.25}$ | 500 | 0 |
| | 7 | $TiS_2$ | 500 | $Cu + Cu_2S$ | 400 | $RbCu_4I_{1.75}Cl_{3.25}$ | 500 | 0 |
| | 8 | $NbS_2$ | 500 | Cu | 400 | $RbCu_4I_{1.75}Cl_{3.25}$ | 500 | 34 |
| | 9 | $NbS_2$ | 500 | $Cu_{0.9}TiS_2$ | 400 | $RbCu_4I_{1.75}Cl_{3.25}$ | 500 | 17 |
| | 10 | $NbS_2$ | 500 | $Cu + Cu_2S$ | 400 | $RbCu_4I_{1.75}Cl_{3.25}$ | 500 | 42 |

As comparative examples, the following cell Nos. 5–10 were made in the same way as cell Nos. 1–4:

Cell No. 5 using a 2:3 (by weight) mixture of $TiS_2$ and solid electrolyte $RbCu_4I_{1.75}Cl_{3.25}$ for positive electrode and a 1:1 (by weight) mixture of Cu and solid electrolyte $RbCu_4I_{1.75}Cl_{3.25}$ for negative electrode.

Cell No. 6 having the same structure as cell No. 5 except for use of $Cu_{0.9}TiS_2$ in place of Cu as negative electrode material.

Cell No. 7 having the same structure as cell No. 5 except for use of a 1:1 (by weight) mixture of Cu and $Cu_2S$ in place of Cu as negative electrode material.

Cell No. 8 using a 2:3 (by weight) mixture of $NbS_2$ and solid electrolyte $RbCu_4I_{1.25}Cl_{3.25}$ for positive electrode and a 1:1 (by weight) mixture of Cu and solid electrolyte $RbCu_4I_{1.75}Cl_{3.25}$ for negative electrode.

Cell No. 9 having the same structure as cell No. 8 except for use of $Cu_{0.9}TiS_2$ in place of Cu as negative electrode material.

Cell No. 10 having the same structure as cell No. 8 except for use of a 1:1 (by weight) mixture of Cu and $Cu_2S$ in place of Cu as negative electrode material.

The structural details of these cell Nos. 5–10 are shown in Table 1.

Each of the thus obtained cell Nos. 1–4 according to Example 1 of this invention and cell Nos. 5–10 of the comparative examples was charged at a constant voltage of 0.6 volts for a period of 17 hours and then discharged at a constant current density of 1 mA/cm$^2$. The relation between cell voltage and elapsed time as observed in the discharging period is shown in FIG. 2.

Figure 2:
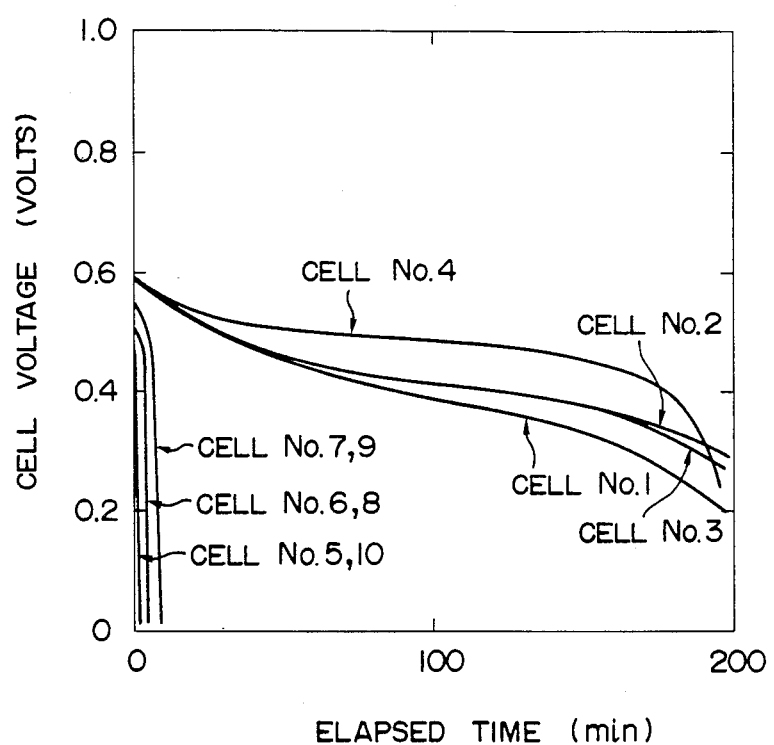
FIG. 2 is a graph showing the change of voltage in the course of discharging of said cell.

It is seen from FIG. 2 that cell Nos. 1–4 according to this invention are very small in voltage drop during discharge and also large in discharge capacity in comparison with cell Nos. 5–10 of the comparative examples. This attests to the excellent performance of the cells of this invention over the conventional ones.

Each of cell Nos. 1–10 was subjected to a high-temperature storage test in which each cell was left at 100° C. for 10 days in a state of being applied with a constant voltage of 0.6 volts and then discharged at a current density of 1 mA/cm$^2$ at 20° C.

The discharge capacity as determined after storage till the cell voltage dropped to 0.3 volts was shown in Table 1 by an index number based on the discharge capacity before storage which was given as 100. Cenn Nos. 1-4 of this invention suffered little drop of discharge capacity even when stored under a high temperature condition of 100° C. Cell Nos. 5-7 of comparative examples using TiS$_2$ for positive electrode could hardly function as a normal cell after high-temperature storage. The cells using NbS$_2$ for positive electrode also lowered by more than 50% in cell capacity after high-temperature storage.

Figure 3:
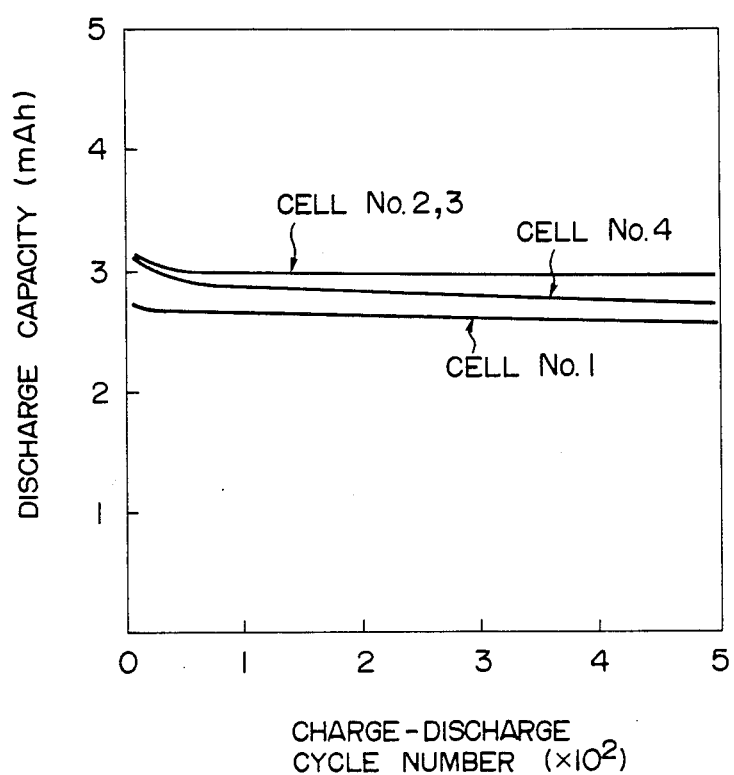
FIG. 3 is a graph showing the relation between cell discharge capacity and charge-discharge cycle number.

By way of reference, each of cell Nos. 1-4 was subjected to repetition of charging and discharging at a voltage between 0.6 and 0.3 volts and a constant current density of 1 mA/cm$^2$. The relation between discharge capacity from 0.6 to 0.3 volts and cycle number in said charge-discharge cycles was determined and shown in FIG. 3.

Each cell suffered little drop of discharge capacity even after 500 charge-discharge cycles and showed excellent charge-discharge cycle performances.

As seen from the above, it is possible to obtain a solid-electrolyte secondary cell having incomparably excellent cell performances by using a copper chevrel compound for both positive and negative electrodes in combination with a copper ion conductive solid electrolyte. It is to be noted particularly that a cell capable of maintaining more flat voltage during discharge and showing better charge-discharge cycle performances can be obtained by selecting the compositions of copper chevrel compound for the positive and negative electrodes so that when the copper chevrel compound is represented by the chemical formula $Cu_xMo_6S_8$, the sum "a" of the value of x of the copper chevrel compound used for the positive electrode and that of the copper chevrel compound of the negative electrode will fall within the range of $1<a<10$, more preferably $5 \leq a < 10$.

Such selection of the range of "a" value is based on the following reason.

The studies by the present inventors on the relation between the potential (vs metallic copper) and composition of copper chevrel compounds and on the reversibility of the redox reaction of Cu$^+$ ions corresponding to the charge-discharge reaction of the cell have revealed the following facts: (1) The copper chevrel compound gives an almost constant potential of about 0.5 volts when the value of x is 0 to 1, and the potential varies stepwise to 0.3-0.2 volts when x=1 to 2, 0.2-0.1 volt when x=2 to 4, and about 0 volt when x=4 to (2) as regards the reversibility, when the value of x exceeds 9, the copper chevrel compound behaves just like metallic copper electrochemically, and the reversibility is worsened excessively.

Thus, when the value of "a" is less than 1, the obtained cell, although having excellent charge-discharge cycle performances, is low in its operating voltage, which is only about several mV. The scope of use of such cell is limited. On the other hand, when the value of "a" is greater than 10, and the positive electrode is operated with x in the range of 0-1, the negative electrodes operates in the range of x greater than 9 and a flat operating voltage of about 0.5 volts is given. However, because of poor reversibility of the negative electrode, there can hardly be obtained excellent charge-discharge cycle performances. Such a cell finds use only in limited applications where the charge-discharge cycle life is not an important matter, for example, where the life of about 50 cycles is sufficient. Thus, considering applicability of the solid-electrolyte secondary cell of this invention to a wide scope of use, $1<a<10$ is selected as the range of "a" value where there can be obtained a relatively high operating voltage as well as excellent charge-discharge cycle performances. Especially, a range of $5 \leq a < 10$ is preferred for obtaining a relatively flat operating voltage of about 0.5 volts.

EXAMPLE 2

Solid-electrolyte secondary cells having a sectional structure such as shown in FIG. 1 were fabricated by using Cu$_2$Mo$_6$S$_8$ (hereinafter referred to as Cu 2) as positive and negative electrode material while using RbCu$_4$I$_{1.5}$Cl$_{3.5}$ (hereinafter referred to as SE 1) as solid electrolyte material. 200 mg (cell No. 11), 300 mg (cell No. 12), 400 mg (cell No. 13), 500 mg (cell No. 14) or 600 mg (cell No. 15) of positive electrode powder prepared by mixing 8 parts by weight of Cu 2 and 2 parts by weight of SE 1 in toluene, 100 mg of SE 1 powder, and 100 mg of negative electrode powder prepared by mixing 8 parts by weight of Cu 2 and 2 parts by weight of SE 1 in toluene were press-molded successively under pressure of 200kg/cm$^2$ to form a three-layer structured cell with a diameter of 10 mm. The gram equivalent of both positive and negative electrodes based on Cu (monovalent) per 100 mg of electrode was given as: $0.1 \times (8/10) \times (2 \times 63.5/958.4) = 1.0 \times 10^{-2}$. The negative electrode was made smaller in weight than the positive electrode, and the copper chevrel compound of negative electrode and that of positive electrode were weighed so that the gram equivalent of the former based on Cu (monovalent) will become smaller than that of the latter, that is, the gram equivalent of negative electrode will become ½ times (cell No. 11), ⅓ times (cell No. 12), ¼ times (cell No. 13), 1/5 times (cell No. 14) or 1/6 times (cell No. 15) that of the positive electrode. Further, in order that the cell will have a more flat operating voltage, the gram equivalent ratio of negative to positive electrode was set in such a manner that it had a smaller value than the shreshold value of ¾, which was given as: $(a-1)/4 = (4-1)4 = ¾$. This limitation of $(a-1)/4$ (where $1 < a \leq 5$) is set as the shreshold value of gram equivalent of negative and positive electrodes necessary for operating the copper chevrel compound of negative electrode in the range of x value of 4 or greater where an almost constant voltage of 0 volt is given when the copper chevrel compound of positive electrode is operated in the range of x value of 0-1 where an almost constant voltage of 0.5 volts is given.

Figure 4:
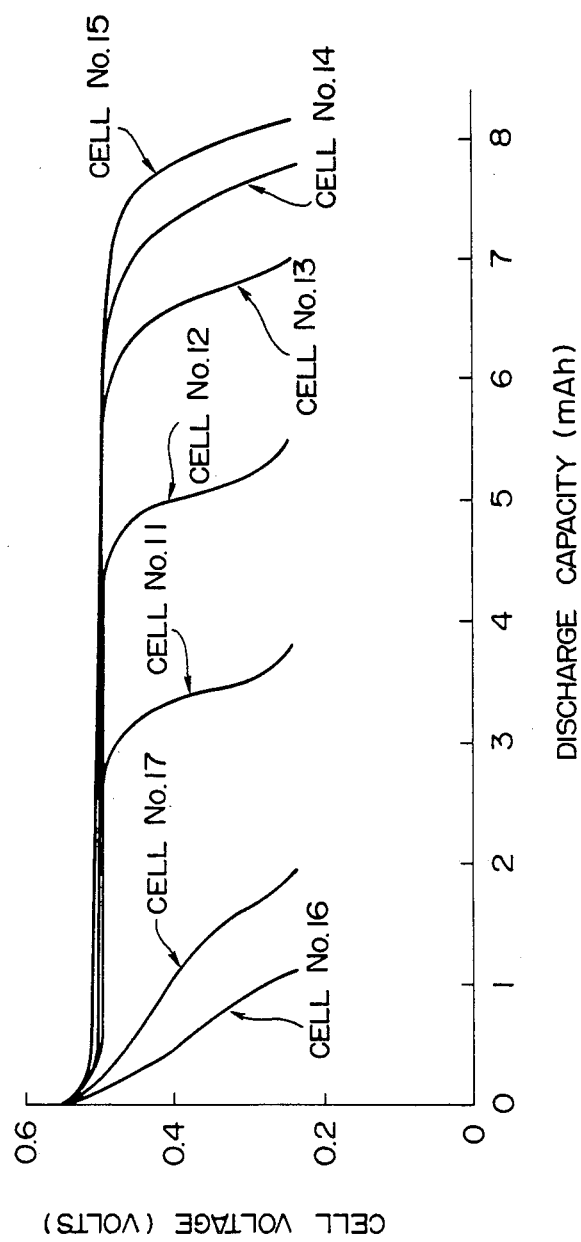
FIGS. 4, 5 and 6 are the graphs showing the change of voltage in the course of discharging of cells.

Each of the thus fabricated cell Nos. 11-15 was charged at a constant voltage of 0.6 volts for 17 hours and then discharged at a constant amperage of 1 mA, and the relation between cell voltage and elapsed time during discharge was determined and shown in FIG. 4. Each cell showed a flat discharge voltage of about 0.5 volts. The discharge capacity till reaching a cell voltage of 0.3 volts was 3.5 mAh in cell No. 11, 5.2 mAh in cell No. 12, 6.9 mAh in cell No. 13, 7.6 mAh in cell No. 14, and 8.1 mAh in cell No. 15. In this case, when the gram equivalent ratio of positive to negative electrode is ¼ or greater, the discharge capacity increases proportionally to the weight of positive electrode (in the case of cell Nos. 11, 12 and 13), but when said ratio is less than ¼, the discharge capacity does not increases proportionally with weight increase of positive electrode (cell Nos. 14 and 15). Thus, when the gram equivalent ratio is less than ¼, the cell capacity per weight decreases, so that in case a=4, the lower limit of gram equivalent ratio is preferably set at ¼.

Cell Nos. 16 and 17 were fabricated in the same way as cell Nos. 11-15 except that the weight of positive electrode was changed to 50 mg (cell No. 16) and 100 mg (cell No. 17). The gram equivalent ratio of positive to negative electrode was 2 in cell No. 16 and 1 in cell No. 17. These cells were charged and discharged in the same way as in the case of cell Nos. 11-15. The discharge curves obtained with these cells are shown in FIG. 4.

Neither cell No. 16 nor cell No. 17 gives a flat voltage. This is attributable to the fact that because of small quantity of $Cu_2Mo_6S_8$ in positive electrode, the amount of Cu supplied to negative electrode is small even if the whole of Cu in $Cu_2Mo_6S_8$ of positive electrode has been transferred to negative electrode, so that the negative electrode becomes operative only in the region of x value of less than 4 where the variation of potential is large.

EXAMPLE 3

Cell Nos. 18, 19 and 20 were constructed in the same way as Example 2 except that $RbCu_4I_{1.25}Cl_{3.75}$ (hereinafter referred to as SE 2) was used as solid electrolyte material, $Cu_2Mo_6S_8$ (Cu 2) as positive electrode material and $Cu_3Mo_6S_8$ (Cu 3) as negative electrode material, and that the weight of positive electrode was made 200 mg (cell No. 18), 300 mg (cell No. 19) and 400 mg (cell No. 20). The gram equivalent per 100 mg of positive electrode was $1.0 \times 10^{-2}$ as in Example 2, and the gram equivalent per 100 mg of negative electrode was $0.1 \times (8/10) \times (3 \times 63.5/1021.9) = 1.5 \times 10^{-2}$. The gram equivalent ratio of positive to negative electrode was ¾ in cell No. 18, ½ in cell No. 19 and ⅜ in cell No. 20. For obtaining a more flat operating voltage, since a=5 in this cell group, the gram equivalent ratio of positive to negative electrode was set at (5-1)/4 =1 or below for the same reason as in the case of cell Nos. 11-15 of Example 2.

Figure 5:
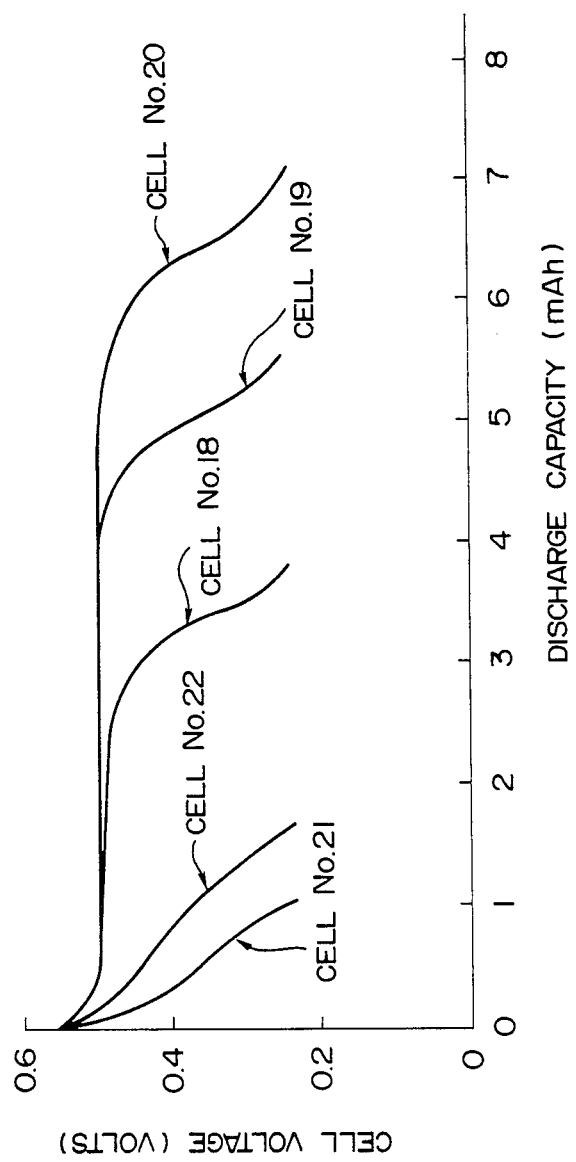

These cell Nos. 18-20 were charged and discharged in the same way as Example 2 to obtain the discharge curves shown in FIG. 5. Each of the cells gave a flat discharge voltage of about 0.5 volts.

Then, cell Nos. 21 and 22 were fabricated in the same way as cell Nos. 18-20 except that the weight of positive electrode was 50 mg (cell No. 21) and 100 mg (cell No. 22). The gram equivalent ratio of positive to negative electrode was 3 in cell No. 21 and 3/2 in cell No. 22. Cell Nos. 21 and 22 were charged and then discharged at a constant amperage of 1 mA in the same way as in the case of cell Nos. 18-20. The results were depicted by discharge curves in FIG. 5. As seen from these discharge curves, no flat cell voltage could be obtained.

As described above, it is possible to obtain a solid-electrolyte secondary cell having a flat operating voltage by properly selecting the composition and weight of copper chevrel compound used for both positive and negative electrodes.

In Examples 1-3, typical examples of the compounds of the formula $K_qRb_{1-q}Cu_4I_{2-p}Cl_{3+p}$ ($0 \leq q \leq 0.5$, $0.25 \leq p \leq 1.0$), viz. $RbCu_4I_{1.5}Cl_{3.5}$ (SE 1), $RbCu_4I_{1.25}Cl_{3.75}$ (SE 2), $K_{0.2}Rb_{0.8}I_{1.5}Cl_{3.5}$ (SE 3) and $K_{0.4}Rb_{0.6}Cu_4I_{1.25}Cl_{3.75}$ (SE 4) were used as copper ion conductive solid electrolyte. In addition to the above compositions, $RbCu_4I_{1.75}Cl_{3.25}$ or $K_{0.2}Rb_{0.8}Cu_4I_{1.75}Cl_{3.25}$ is useable. Beside the compounds represented by the above-shown formulas it is also possible to use solid electrolytes prepared by adding quaternary ammonium salts such as hexamethylenetetramine to CuBr or $CuX-Cu_2O-MoO_3$ (X=I or Br) type vitreous sold electrolytes such as $Cu_5I_2Mo_{1.5}O_4$.

However, the investigations by the present inventors showed that RbCl-CuCl-CuI type solid electrolytes represented by the formula $K_qRb_{1-q}Cu_4I_{2-p}Cl_{3+p}$ were the most preferred as copper ion conductive solid electrolyte to be used in combination with copper chevrel compound. The present inventors consider that this probably owes to the good affinity of these solid electrolytes for copper cheveral compounds through the medium of $Cu^+$ ions When making a cell by using said solid electrolytes and copper shevrel compounds, it is possible to obtain a cell with small voltage drop during discharge by using a mixture of said materials for both positive and negative electrodes The solid electrolytes of the formula $K_qRb_{1-q}Cu_4I_{2-p}Cl_{3+p}$ are softer and easier to pulverize than copper chevrel compounds. Therefore, it is considered that the finely divided particles of the solid electrolyte formed in the course of mixing with copper chevrel compound would surround the particles of copper chevrel compound to form uniform and fine networks of electrons and $Cu^+$ ions as a whole, so that the mixture can act as positive and negative electrodes with minimized polarization.

EXAMPLE 4

With a view to obtaining a solid-electrolyte secondary cell further improved in polarization characteristics of the copper chevrel compound electrode and smaller in voltage drop during discharge, a cell was made by using a positive electrode material and a negative electrode material obtained by mixing a copper chevrel compound and a copper ion conductive solid electrolyte and subjecting the mixture to a heat treatment.

The positive electrode material was prepared by mixing 2 parts by weight of powder of solid electrolyte $RbCu_4I_{1.5}Cl_{3.5}$ and 8 parts by weight of powder of copper chevrel compound $C_2Mo_6S_{7.8}$ by mixer in dry nitrogen, press-molding about 2 g of the mixture into pellets of 10 mm in diameter under a pressure of 200 kg/cm², heating the pellets in an argon gas atmosphere at 200° C. for 17 hours, and then pulverizing them into powder passing 100% through 200-mesh screen.

The negative electrode material was prepared in the same way as above except for use of $Cu_4Mo_6S_{7.6}$ as copper chevrel compound.

Cell No. 23 having the sectional structure shown in FIG. 1 and a diameter of 10 mm was made by using said materials. The weight of solid electrolyte layer 2 was 100 mg, that of positive electrode layer 1 was 200 mg, and that of negative electrode layer 3 was 200 mg.

By way of comparison, cell No. 24 was made by using the similarly prepared materials which, however, were not subjected to the heat treatment.

Figure 6:
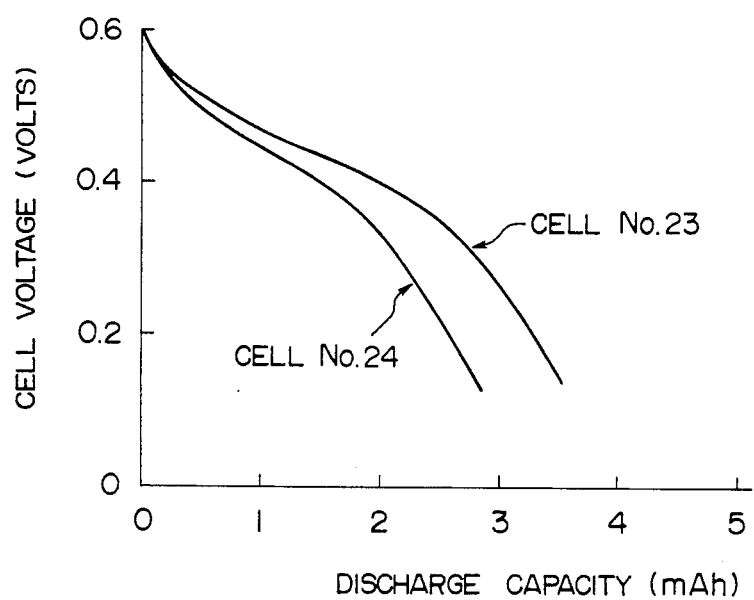

Both of cell No 23 and cell No. 24 were charged at 0.6 volts for 24 hours and then discharged at a constant current density of 1 mA/cm² at 20° C. Their discharge curves are shown in FIG. 6.

Cell No. 23 made by using the heat treated materials had a discharge capacity of 2.85 mAh (capacity till reaching a voltage drop to 0.3 volts), while cell No. 24 made by using the non-heat treated materials had a discharge capacity of 2.20 mAh. It is seen that the heat treatment improves the polarization characteristics of copper chevrel compound electrodes and provides a cell reduced in voltage drop during discharge.

EXAMPLE 5

Cell Nos. 25, 26, 27, 28, 29, 30 and 31 having the sectional structure shown in FIG. 1 were made by using $K_{0.2}Rb_{0.8}Cu_4I_{1.5}Cl_{3.5}$ (hereinafter referred to as SE 3) as solid electrolyte while using for positive and negative electrodes a material obtained by mixing 2 parts by weight of said solid electrolyte and 8 parts by weight of a copper chevrel compound $Cu_3Mo_6S_8$ and heat-treating the mixture in an argon gas atmosphere at temperatures of 60° C., 100° C., 130° C., 160° C., 200° C., 240° C. and 280° C. for 17th hours. The heat treatment of positive and negative electrode material was conducted in the same way as in Example 4. These cells were charged and discharged after the manner of Example 4, and the discharge capacities of these cells till reaching a cell voltage of 0.3 volts were measured. The results are shown in Table 2.

TABLE 2

| Cell No. | Heating temperature (°C.) | Discharge capacity (mAh) |
| --- | --- | --- |
| 25 | 60 | 2.12 |
| 26 | 100 | 2.16 |
| 27 | 130 | 2.58 |
| 28 | 160 | 2.65 |
| 29 | 200 | 2.68 |
| 30 | 240 | 2.66 |
| 31 | 280 | 1.90 |

Although $K_{0.2}Rb_{0.8}Cu_4I_{1.5}Cl_{3.5}$ (SE 3) was used as solid electrolyte in the above example, the same heating temperature/discharge capacity relation as shown in Table 2 can be obtained by using other solid electrolyte compounds represented by the formula $K_qRb_{1-q}Cu_4I_{2-p}Cl_{3+p}$.

It is seen from the above that in the case of using $K_qRb_{1-q}Cu_4I_{2-p}Cl_{3+p}$ as solid electrolyte, the heat treatment is preferably carried out at a temperature between 130° C. and 240° C.

Also, the heat treatment is preferably conducted in an atmosphere of an inert gas such as argon, nitrogen, helium and the like or under reduced pressure of about 1 mmHg. If the mixture is heated in the presence of oxygen or water or both of them, monovalent Cu ions in solid electrolyte and copper chevrel compound are oxidized into divalent Cu ions to break the ion conductive network in the mixture, resulting in greatly deteriorated polarization characteristics.

Copper chevrel compounds and solid electrolytes of the formula $K_qRb_{1-q}Cu_4I_{2-p}Cl_{3+p}$, either in the single form or in the form of a mixture, are very stable thermally and never cause a chemical reaction under an inert gas atmosphere or under reduced pressure with oxygen and water being substantially eliminated and at a temperature below 240° C. Also, said solid electrolytes, when heated to a temperature above 130° C., are brought into a sintered state while undergoing recombination of the electrolyte components and cover the copper chevrel compound particle surfaces very closely, probably to a closeness of atomic order. For these reasons, the solid electrolyte and copper chevrel compound used in this invention won't be denatured by heating and are well bonded ionically to reduce polarization.

Needless to say, such effect can be obtained from the combinations of not only solid electrolytes represented by $K_qRb_{1-q}Cu_4I_{2-p}Cl_{3+p}$ but also other types of copper ion conductive solid electrolytes with copper chevrel compounds, but the temperature range of 130°–240° C. for the heat treatment is specific to the combinations of $K_qRb_{1-q}Cu_4I_{2-p}Cl_{3+p}$ and copper chevrel.

In the above examples of this invention, only the cells using mixtures of copper chevrel compounds and copper ion conductive solid electrolytes for positive and negative electrodes have been shown and described, but when an ion conductive network capable of effecting transfer of a sufficient amount of $Cu^+$ ions can be formed with a copper chevrel compound alone, for example, when a thin film of copper chevrel compound with a thickness of about $1\mu$ or less is used as positive and negative electrodes, it is possible to achieve the effect of this invention by using a copper chevrel compound alone, without mixing a copper ion conductive solid electrolyte.

EFFECT OF THE INVENTION

As described above, by using a copper chevrel compound for positive and negative electrodes and combining it with a copper ion conductive solid electrolyte, it is possible to realize a solid-electrolyte secondary cell which has a large capacity, is capable of providing a large current and has excellent charge-discharge cycle performances and high-temperature storage properties. Also, a cell with flat operative voltage can be obtained by properly selecting the composition and weight of copper chevrel compound used for positive and negative electrodes. Further, by using a heat treated electrode material, or by using a specific copper ion conductive solid electrolyte and an electrode material which have been heat treated in a specific temperature range, it is possible to obtain a cell which is further reduced in voltage drop during discharge and capable of yielding a still larger electric current.

What we claim is:

1. A solid-electrolyte secondary cell comprising a positive electrode and a negative electrode both of which are mainly composed of a copper chevrel compound, and a copper ion conductive solid electrolyte.

2. A solid-electrolyte secondary cell according to claim 1, characterized by using a copper chevrel compound represented by the chemical formula $Cu_xMo_6S_8$, wherein the sum "a" of the value of x of the copper chevrel compound of the positive electrode and that of the copper chevrel compound of the negative electrode falls in the range of $1 < a < 10$.

3. A solid-electrolyte secondary cell according to claim 2, wherein "a" is in the range of $5 \leq a < 10$.

4. A solid-electrolyte secondary cell according to claim 3, wherein the value of x of the copper chevrel compound used for positive and negative electrodes is 4.

5. A solid-electrolyte secondary cell according to claim 3, wherein the value of x of the copper chevrel compound used for positive electrode is 4, and the value of x of the copper chevrel compound used for negative electrode is 2.

6. A solid-electrolyte secondary cell according to claim 3, wherein the value of x of the copper chevrel compound used for positive electrode is 2, and the value of x of the copper chevrel compound used for negative electrode is 4.

7. A solid-electrolyte secondary cell according to claim 2, wherein the sum "a" of the value of x of the copper chevrel compound of positive electrode and that of the copper chevrel compound of negative electrode is in the range of $1 < a \leq 5$, and the amount of the copper chevrel compound used for negative electrode, as calculated in terms of gram equivalent based on monovalent Cu, is smaller than the similarly calculated amount of the copper chevrel compound used for positive electrode.

8. A solid-electrolyte secondary cell according to claim 7, wherein the amount of the copper chevrel compound of negative electrode, as calculated in terms of gram equivalent based on monovalent Cu, is $(a-1)/4$ or less of the similarly calculated amount of the copper chevrel compound of positive electrode.

9. A solid-electrolyte secondary cell according to claim 7 wherein the value of x of the copper chevrel compound used for positive and negative electrodes is 2.

10. A solid-electrolyte secondary cell according to claim 1, wherein the positive and negative electrodes are made of a mixture of a copper chevrel compound and a copper ion conductive solid electrolyte.

11. A solid-electrolyte secondary cell according to claim 10, wherein the positive and negative electrodes are made of a mixture of a copper chevrel compound and a copper ion conductive solid electrolyte, said mixture having been heat treated in an inert gas atmosphere or under reduced pressure.

12. A solid-electrolyte secondary cell according to claim 1, wherein the copper ion conductive solid electrolyte used is the one represented by the formula $K_qRb_{1-q}Cu_4I_{2-p}Cl_{3+p}$ ($0 \leq q \leq 0.5$, $0.25 \leq p \leq 1.0$).

13. A solid-electrolyte secondary cell according to claim 11, wherein the positive and negative electrodes are made of a mixture of a copper chevrel compound and a copper ion conductive solid electrolyte represented by the formula $K_qRb_{1-q}Cu_4I_{2-p}Cl_{3+p}$ ($0 \leq q \leq 0.5$, $0.25 \leq p \leq 1.0$), said mixture having been heat treated in an inert gas atmosphere or under reduced pressure at a temperature of 130° C. to 240° C.

14. A solid-electrolyte secondary cell comprising a positive electrode and a negative electrode both of which are composed of a copper chevrel compound alone, and a copper ion conductive solid electrolyte, the whole being constructed as an integral solid structure.

15. A solid-electrolyte secondary cell comprising a positive electrode and a negative electrode both of which are mainly composed of a copper chevrel compound represented by the formula $Cu_xMo_6S_8$, and a copper ion conductive solid electrolyte disposed between said positive and negative electrodes, wherein the sum "a" of the value of x of the copper chevrel compound of positive electrode and that of the copper chevrel compound of negative electrode falls within the range of $1 < a < 10$.

16. A solid-electrolyte secondary cell comprising a positive electrode mainly composed of a copper chevrel compound represented by the formula $Cu_4Mo_6S_8$, a negative electrode mainly composed of a copper chevrel compound represented by the formula $Cu_2MoS_8$, and a copper ion conductive solid electrolyte disposed between said positive and negative electrodes.

17. A solid-electrolyte secondary cell comprising a positive electrode mainly composed of a copper chevrel compound represented by the formula $Cu_2Mo_6S_8$, a negative electrode mainly composed of a copper chevrel compound represented by the formula $Cu_4MoS_8$, and a copper ion conductive solid electrolyte disposed between said positive and negative electrodes.

18. A solid-electrolyte secondary cell comprising a negative electrode made of a mixture of a copper chevrel compound represented by the formula $Cu_xMo_6S_{8-y}$ ($2 < x < 4$, $0 < y < 0.2$) and a solid electrolyte, a positive electrode made of a mixture of a copper chevrel compound represented by the formula $Cu_xMo_6S_{8-y}$ ($0 < x < 2$, $0 < y < 0.2$) and said solid electrolyte, and an electrolyte of the formula $K_xRb_{1'x}Cu_4I_{1.5}Cl_{3.5}$ ($0 < x < 0.2$) which is the same in composition as said solid electrolyte.

19. A solid-electrolyte secondary cell according to claim 8, wherein the value of x of the copper chevrel compound used for positive and negative electrodes is 2.

* * * * *